United States Patent Office 3,527,768
Patented Sept. 8, 1970

3,527,768
SULFONAMIDO COUMARIN COMPOUNDS
Gerald L. Bachman, Kirkwood, Mo., assignor to Monsanto Company, St. Louis, Mo., a corporation of Delaware
No Drawing. Filed Nov. 24, 1967, Ser. No. 685,318
Int. Cl. C07d 7/28
U.S. Cl. 260—343.2                          9 Claims

ABSTRACT OF THE DISCLOSURE

This disclosure covers certain halogenated sulfonamido coumarins as new chemical compounds. These compounds have been found to be useful in the control of bacteria.

---

This invention relates to a novel class of organic chemical compounds. More particularly, this invention is concerned with novel coumarinyl and phenyl derivatives of halogenated sulfonamido coumarin. Such materials have been found to possess useful and unexpected biological activity.

The novel compounds of this invention have the formula

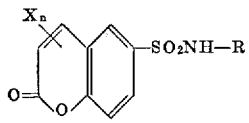

wherein R is selected from

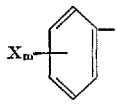

and

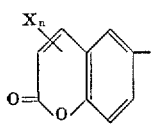

X is selected from chlorine and bromine, $n$ is an integer from one to two, and $m$ is an integer from zero to two.

The novel sulfonamido coumarins of this invention can be readily prepared by reacting an aniline or an aminocoumarin with a halogenated coumarin sulfonyl chloride. A typical reaction is illustrated by the following equation:

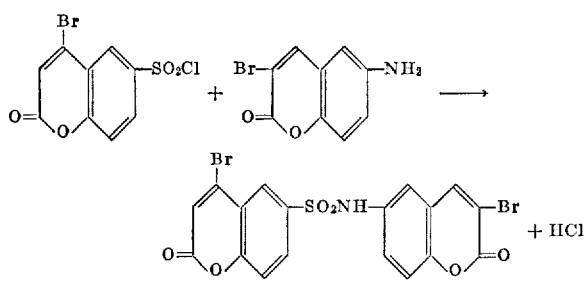

The sulfonyl chloride starting material is simply prepared by heating together a halogenated coumarin and chlorosulfonic acid.

The invention will be more fully understood by reference to hte following examples which are set forth herein for purposes of illustration only. Such examples are not to be construed as limiting the scope of the present invention in any manner.

EXAMPLE I

A suitable reaction vessel is charged with a solution of 0.32 gram (0.002 mole) of 3,4-dichloroaniline in 20 ml. of acetic acid. The solution is stirred and heated at about 100° C. while 0.7 gram (0.0022 mole) of 3,4-dichlorocoumarin-6-sulfonyl chlorine is added. Then, 250 milligrams of sodium acetate is added portionwise to the hot solution over a period of 20 minutes. Stirring is continued for an additional 15 minutes, after which the reaction mixture is filtered. The filtrate is cooled, and water is added. The solid product which forms is filtered and then recrystallized from toluene. There is obtained 0.3 gram of 6-(3,4-dichlorophenylsulfonamido)-3,4-dichlorocoumarin as a brown solid, M.P. 199–200° C.

EXAMPLE II

Following the detailed procedure of Example I, the reactants employed are 0.26 gram of 4-chloroaniline and 0.61 gram of 3-chlorocoumarin-6-sulfonyl chloride. The product obtained is 6 - (4-chlorophenylsulfonamido)-3-chlorocoumarin.

EXAMPLE III

Following the detailed procedure of Example I, the reactants employed are 0.19 gram of aniline and 0.7 gram of 3,4-dichlorocoumarin-6-sulfonyl chloride. The product obtained is 6-phenylsulfonamido-3,4-dichlorocoumarin.

EXAMPLE IV

A suitable reaction vessel is charged with a solution of 0.35 gram (0.0015 mole) of 6-amino-3,4-dichlorocoumarin in 20 ml. of acetic acid. The solution is stirred and heated at about 100° C. while 0.5 gram (0.0016 mole) of 3,4-dichlorocoumarin-6-sulfonyl chloride is added. Then, 170 milligrams of sodium acetate is added portionwise to the hot solution over a period of 20 minutes. Stirring is continued for an additional 5 minutes, after which the reaction mixture is filtered. The filtrate is cooled, water is added, and the product which precipitates is filtered out, dissolved in acetone and refiltered. Skellysolve B (a commercially available, essentially n-hexane solvent having a boiling range of 140–160° F.) is then added to the acetone solution to precipitate the product. There is obtained 0.1 gram of N-[6-(3,4-dichlorocoumarinyl)]-6-(3,4-dichlorocoumarinsulfonamide) as a tan solid, M.P. 274–276° C.

EXAMPLE V

Following the detailed procedure of Example IV, the reactants employed are 0.48 gram of 6-amino-3,4-dibromocoumarin and 0.45 gram of 4-chlorocoumarin-6-sulfonyl chloride. The product obtained is N-[6-(3,4-dibromocoumarinyl)]-6-(4-chlorocoumarinsulfonamide).

EXAMPLE VI

Following the detailed procedure of Example IV, the reactants employed are 0.36 gram of 6-amino-3-bromocoumarin and 0.5 gram of 3,4-dichlorocoumarin-6-sulfonyl chloride. The product obtained is N-[6-(3-bromocoumarinyl)]-6-(3,4-dichlorocoumarinsulfonamide).

As stated above, the products of the present invention possess useful and unexpected biological activity, and they are particularly adapted to be employed for the control of gram positive bacterial organisms. In a standard, art-recognized test, N-[6-(3,4-dichlorocoumarinyl)]-6-(3,4-dichlorocoumarinsulfonamide) is found to be effective against *Staphylococcus aureus*, a representative gram positive species, at a dilution in excess of 1 part per million. In the same standard, art-recognized test, 6-(3,4-dichlorophenylsulfonamido) - 3,4 - dichlorocoumarin was also found to be effective against said species at a dilution in excess of 1 part per million. Similar activity is displayed by other and different sulfonamido coumarin compounds of this invention.

While the invention has been described herein with regard to certain specific embodiments, it is not so limited. It is to be understood that variations and modifications thereof may be made by those skilled in the art without departing from the spirit and scope of the invention.

What is claimed is:

1. A compound of the formula

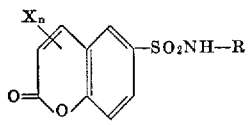

wherein R is selected from

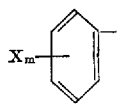

and

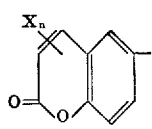

X is selected from chlorine and bromine, $n$ is an integer from one to two, and $m$ is an integer from zero to two.

2. A compound as defined in claim 1 wherein R is

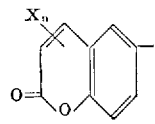

3. A compound as defined in claim 1 wherein R is

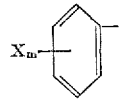

4. A compound as defined in claim 2 wherein X is chlorine.

5. A compound as defined in claim 3 wherein X is chlorine.

6. A compound as defined in claim 4 wherein each $n$ is two.

7. A compound as defined in claim 5 wherein $m$ and $n$ are each two.

8. A compound as defined in claim 1 wherein R is 3,4-dichlorophenyl, X is chlorine and $n$ is two.

9. A compound as defined in claim 1 wherein R is 3,4-dichloro-6-coumarinyl, X is chlorine and $n$ is two.

References Cited

UNITED STATES PATENTS 3,089,878   5/1963   Meyer _____ 260—343.2

JAMES A. PATTEN, Primary Examiner

U.S. Cl. X.R.

260—999; 424—281